United States Patent [19]

Hirota et al.

[11] Patent Number: 4,869,488

[45] Date of Patent: Sep. 26, 1989

[54] AUTOMATIC SHEET-FEEDER

[75] Inventors: Fumiyuki Hirota; Tadashi Miwa; Yasushi Yamada, all of Hachioji, Japan

[73] Assignee: Konishiroku Photo Industry Co., Ltd., Tokyo, Japan

[21] Appl. No.: 279,301

[22] Filed: Dec. 1, 1988

Related U.S. Application Data

[63] Continuation of Ser. No. 869,104, May 30, 1986, abandoned.

[30] Foreign Application Priority Data

Jun. 4, 1985 [JP] Japan ................. 60-122247

[51] Int. Cl.[4] ............................................. B65H 5/06
[52] U.S. Cl. .................................... 271/3.1; 271/171; 271/254
[58] Field of Search ................. 271/3.1, 117, 162, 171, 271/254

[56] References Cited

U.S. PATENT DOCUMENTS

| | | | |
|---|---|---|---|
| 2,474,983 | 7/1949 | Peyrebrune | 271/254 X |
| 3,080,163 | 3/1963 | Pasquinelli | 271/254 |
| 4,231,562 | 11/1980 | Hori | 271/3.1 |
| 4,469,319 | 9/1984 | Robb | 271/171 X |

Primary Examiner—Richard A. Schacher
Attorney, Agent, or Firm—Jordan B. Bierman

[57] ABSTRACT

This invention relates to an automatic sheet-feeder for feeding a sheet from the bottom of a stack of sheets placed on a sheet tray and for circularly returning the sheet to the top of the stack. The sheet tray comprises a movable tray and a stationary tray, and the movable tray can move upward or downward in accordance with the size of the sheet, and further the movable tray comprises an intermediate sheet-feed to transport the sheet, whereby the edges of the pile of sheets are aligned in order to prevent erroneous sheet-feeding.

21 Claims, 7 Drawing Sheets

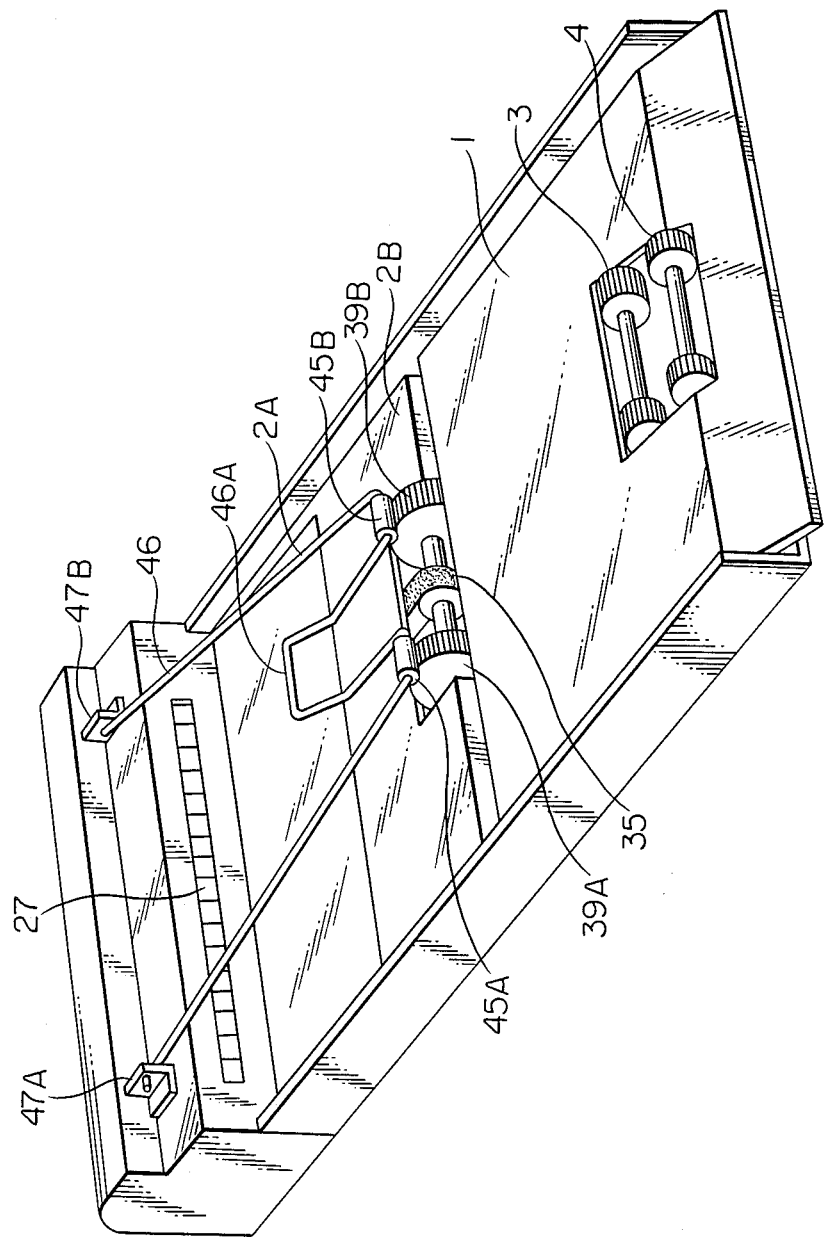

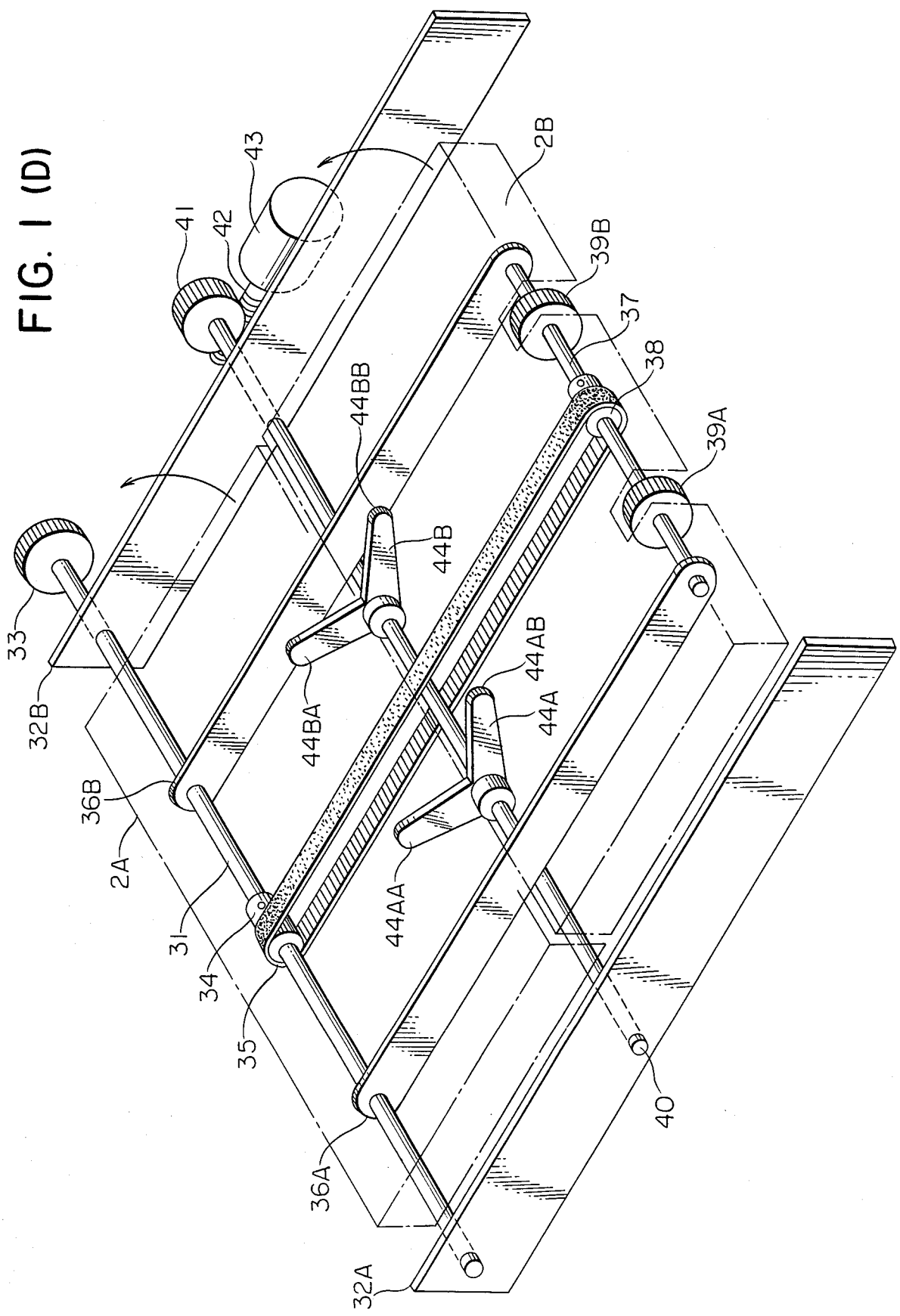

AUTOMATIC SHEET-FEEDER

This application is a continuation of application Ser. No. 869,104, filed 05/30/86 abandoned.

BACKGROUND OF THE INVENTION

This invention relates to an automatic sheet-feeder and, more specifically, to an automatic sheet-feeder for feeding sheets from the lowermost of a pile of sheets (hereinafter called a stack) placed on a sheet-tray and for circularly returning the sheets to the sheet-tray.

Generally, in the case of making a plurality of copied sets of an original document of a plurality of original sheets such as manuscript paper or copied paper (hereinafter called sheets), the copying operation has so far been carried out in such a manner that, first, the first sheet is placed on an original platen and is then copied, and next, the second sheet is placed in place of the first sheet on the original platen and is then copied, thereafter the same operation follows, and then all of the sheets are placed one after another on the original platen and are then copied.

Meanwhile, the copies made from the first sheet are sorted one by one to separate positions, and the copies made from the second sheet are superposed one by one on the first copies. Thereafter, the same superposing operation follows, and all of the copies are superposed successively and in order, so that a plurality of copied sets of the plurality of documents may be made. Such a copying operation as mentioned above has been very troublesome and complicated for copying operators.

To solve the above-mentioned difficulties, an automatic sorting means, that is called a sorter, has been manufactured for automatically sorting copied sheets one by one. It has, however, been inevitable that such a sorter has required many spaces to sort a large number of copied documents (e.g. 20 to 30 or more) and it has also been troublesome to take out the sets of copied documents one by one from the respective sorted positions.

Accordingly, in recent years, there have been various proposals of such a means as those described in, for example, Japanese Patent Examined Publication No. 34416/1975, Japanese Utility Model O.P.I. Publication No. 55445/1976, Japanese Patent Examined Publication Nos. 27343/1980 and 37536/1981, and the like. The means of this kind have been designed to operate in the following manner: When an original document comprising a plurality of sheets is set in the firm of a stack, the first original sheet thereof is conveyed onto an original platen to make one copy only and is then returned to the original stack. Next, the second original sheet is conveyed onto the original platen to make one copy only and is then returned to the original stack, and so on. After all of the original sheets are copied, they are returned to the original stack, and the respective copies are made up into a single set of the copied documents. The same procedure is successively repeated so as to make up into a prescribed number of the copied documents.

With the means of this kind, however, the following requirements must be fully satisfied:

(1) Every sheet is to be separated and conveyed one after another.

The reason is that, should there be two or more sheets conveyed together, the corresponding copied sheets will be missing from some sets of copied documents.

(2) Every sheet separated from the stack is to be properly conveyed to a given position on an original platen.

The reason is that, should there be a sheet improperly positioned in place on the original platen, an improper copy, a partly missing copy, or a skewed copy will result.

(3) Each sheet is to be kept from crumbling, tearing, and the like.

This requirement is important particularly when there are no extra copies of the document to be copied.

(4) Each sheet already copied is to be properly returned to the original stack.

The reason is that, should there be any sheet improperly returned to the original stack, the preparations for the subsequent copying operation are hindered.

(5) Every procedure such as sheet conveyance, copying, returning the sheet to the stack position, is to be carried out without fail, regardless of the sizes and thickness of the sheets which are to be copied.

The reason is that there may be some instances where the sheets of a document are different in size and thickness from each other. More particularly, in relation to requirement (5), when using a conventional bottom feed and recirculating type automatic sheet-feeder such as that described in Japanese Patent Examined Publication No. 40338/1981, there is the possibility of causing a defective sheet because, when copied sheets are returned to the stack on the original sheet tray, the sheet can not be superposed in the required correct position, and then the selvages of the sheets returned to the stack cannot be aligned. Therefore, the lowermost sheet of the stack cannot be conveyed therefrom.

With the purpose of preventing the above-mentioned undesirable possibility, there is also known a method of truing up the selvages of sheets in which a tilted sheet-tray is provided so as to urge the sheets by their own weight against a stop fitted to the lower part of the tray.

Even with the above-mentioned fixed sheet tray, however, defective sheet feeds are still caused, because some sheets do not stop at the desired position due to differences in the sizes, weights, circulating speeds, etc. of the sheets, so that the selvages of the sheets are not aligned. Particularly with a high-speed copying machine, the above-mentioned defect is very often caused, because the circulating speeds of the sheets (and original documents) are accelerated. For the purpose of avoiding the above-mentioned defects, there has been devised a suction type conveyor belt. However, this device has a complicated mechanism and, in addition, is noisy.

SUMMARY OF THE INVENTION

This invention overcomes the above-mentioned defects in the conventional techniques, and it is, therefore, a principal object of the invention to provide a novel automatic sheet feeder of improved sheet feed reliability, compact size, and quiet in operation.

The automatic sheet feeder of the invention is operated in such a manner that a stack of sheets to be fed is placed on a sheet tray and the sheets are fed from the bottom of the stack and are separated from one another by a separating means and, therefore, each sheet is circularly returned to the above-mentioned sheet tray. It is characterized in that the sheet tray comprises a stationary fixed tray and a movable tray and, preferably, there is an intermediate sheet feed member at one end of the above-mentioned movable tray.

BRIEF DESCRIPTION OF THE DRAWINGS

The series of FIG. 1 illustrates the automatic sheet feeder of the invention.

The series of FIG. 2 illustrates an automatic sheet feeder in the state where medium-sized sheets are being fed.

The series of FIG. 3 illustrates an automatic sheet feeder wherein small-sized sheets are being fed.

DETAILED DESCRIPTION OF THE PREFERRED EMBODIMENTS

Figure 1:
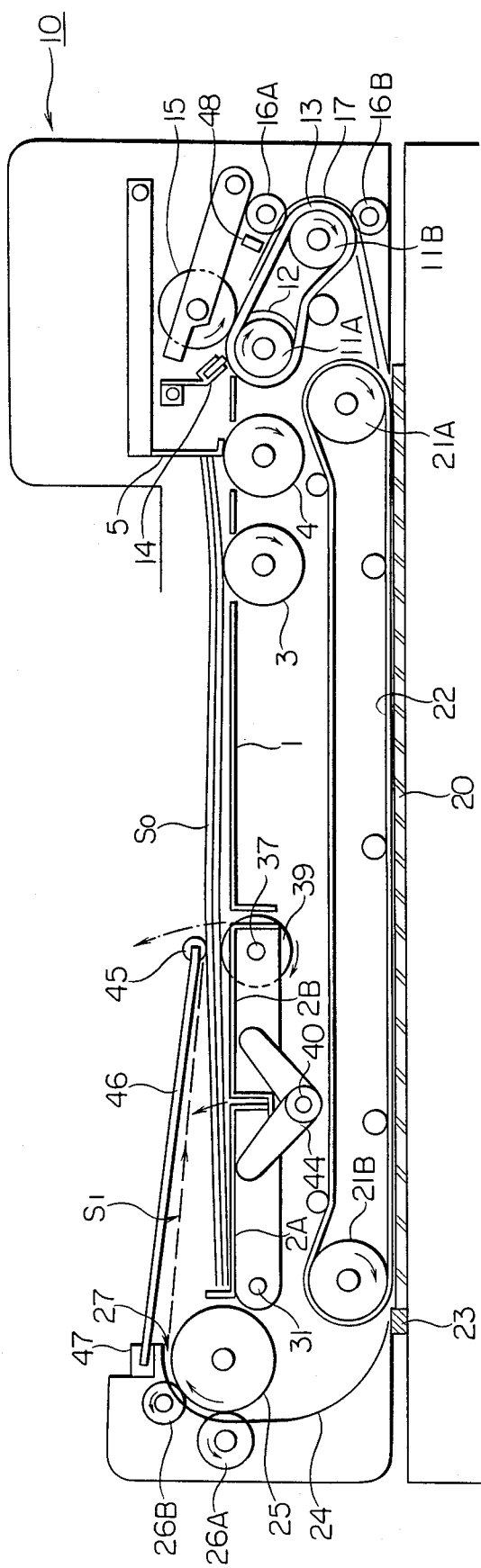
FIG. 1(A) is a cross-sectional view thereof.
FIGS. 1(B) and 1(C) are perspective views of substantial portions thereof.
FIG. 1(D) is a perspective view of a portion of the internal mechanism thereof.
Figure 1:
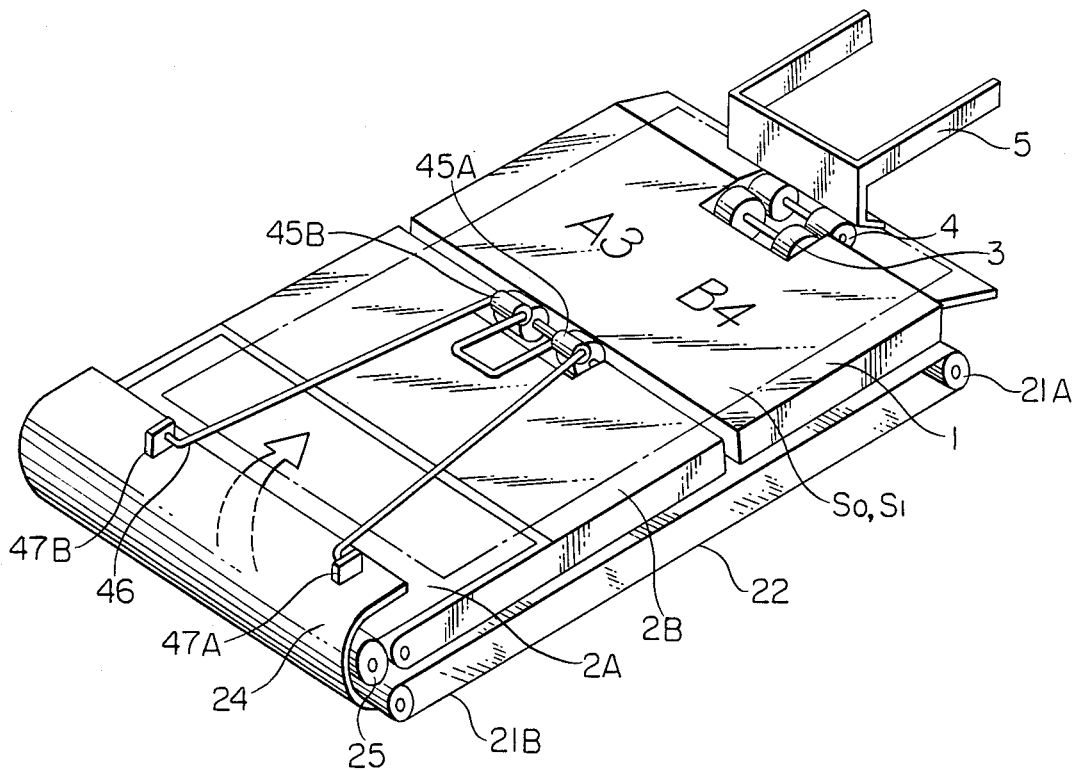

The series of FIG. 1 each illustrates an automatic sheet feeder of a bottom feeding and circulating sheet type of the invention, FIG. 1(A) shows a cross sectional view thereof, FIGS. 1(B) and 1(C) are perspective views each showing substantial portions thereof, and FIG. 1(D) is a perspective view showing a substantial portion of the internal mechanism thereof.

In the drawings, a stack of sheets $S_0$ consisting of a plurality of sheets of paper such as manuscript paper, copy paper or the like is placed on a sheet tray which comprises a fixed tray 1 being stationary and one or more sections of tiltable feed trays 2A, 2B which are one embodiment of the movable tray. To the downstream side of the fixed tray 1, there are provided the 1st feed rollers 3 and 4 so as to rotatively drive sheets, and to the upper part of the 1st feed rollers, there is provided with a swingable sheet stopper 5.

To the right-hand end (i.e., the down-stream side) of fixed tray 1, there is arranged sheet separating means 10 which comprises sheet separating and feeding belt 13 wound around rollers 11A and 11B for feeding sheets, feed roller 12 arranged on the same axis as roller 11A; sheet separating blade 14 coming into pressing contact with the outer surface of feed roller 12; sheet separating roller 15 coming into pressing contact with the upper part of sheet separating and feeding belt 13; 2nd sheet feed rollers 16A and 16B, each driven by coming into pressing contact with the down-stream side of sheet separating and feeding belt 13; and guide plate 17.

Sheet feed belt 22 is arranged onto original document platen 20 and is wound around both rollers 21A and 21B. At the left-hand end of the prescribed copying position of original document platen 20 in FIG. 1(A), there are provided sheet stopper 23, sheet delivery guide 24, sheet delivery roller 25, and driven rollers 26A and 26B in that order from the left-hand side to the upper part in FIG. 1(A). Numeral 27 is a sheet delivery outlet. Referring to FIG. 1(D), sheet feed tray 2A is rotatable about driving shaft 31, which is so supported as to be freely rotable in side plates 32A and 32B on the both sides thereof and is driven by a driving system (not shown) through gear 33. To the middle portion of driving shaft 31, cogged pulley 34 is fixed and around which cogged belt 35 is wound. Also, on driving shaft 31, one end each of two arms 36A and 36B is freely rotatable, and rotatable shaft 37 is freely rotatable at each of the other ends of the arms 36A and 36B. To the approximate center of rotatable shaft 37, cogged pulley 38 and intermediate feed rollers 39A and 39B are coaxially fixed. Cogged belt 35 extends around both of cogged pulleys 38 and 39; therefore, rotatable shaft 37 and intermediate feed rollers 39A and 39B are rotated by the driving force transmission of driving shaft 31.

One portion each of the respective feed trays 2A and 2B comes into contact with arms 36A and 36B. When arms 36A and 36B rotate upwards about driving shaft 31, feed trays 2A and 2B are lifted up at the same time.

On the other hand, turning shaft 40 is supported at the lower part of the center of side plates 32A and 32B so as to be freely rotatable. One end of turning shaft 40 projects outwardly through side plate 32B and worm wheel 41 is fixed thereto. Turning shaft 40 is rotatively driven by a transmission mechanism comprising worm 42 fitted on the driving shaft of motor 43 and worm wheel 41.

On the middle portion of turning shaft 40, there are fixed two V-shaped rocking levers 44A and 44B. The driving force of motor 43 makes rocking levers 44A and 44B turn clockwise or counterclockwise, through the transmission mechanism.

One tip 44AA of rocking lever 44A and one tip 44BA of rocking lever 44B move upward contacting with or downward away from the inner surface of feed tray 2A according to the rotation direction of turning shaft 40, thereby feed tray 2A is forcibly lifted up or is lowered by its own weight. Another tip 44AB of rocking lever 44A and another tip 44BB of rocking lever 44B move upward contacting with or downward away from the inner surface of feed tray 2B according to the rotation direction of turning shaft 40. In this manner, feed tray 2B is forcibly lifted up or is lowered by its own weight.

With reference to FIG. 1(C), driven rollers 45A and 45B come into pressing contact with the upper parts of each of intermediate feed rollers 39A and 39B, respectively, so that driven rollers 45A and 45B are freely rotatable. Arm 46 is fixed to the shaft of the driven rollers 45A and 45B, and the both ends of arm 46 are inserted in and held by holding members 47A and 47B. Accordingly, arm 46 is freely rotatable about holding members 47A and 47B which serve as the central axis of rotation and driven rollers 45A and 45B are so fitted to the top of arm 46 as to be freely rotatable. Therefore, driven rollers 45A and 45B are brought into pressing contact with the intermediate feed rollers 39A and 39B by the weight of arm 46 and driven rollers 45A and 45B. The above-mentioned pressing contact may be released when picking up handle 46A of arm 46.

Next, the operation of the automatic sheet feeder relating to the invention will be described with reference to FIGS. 1(A) through 1(D). The drawings each illustrate a state where sheet stack $S_0$, consisting of the longest sheets, is fed by the above-mentioned automatic sheet feeder; wherein, stack $S_0$ is A3 or B4 in size [specified in Japanese Industrial Standard (JIS)], for example. When giving a command for feeding stack $S_0$, motor 43, such as a pulse motor, starts to drive rocking levers 44A and 44B so as to be in the neutral position as shown in the drawings. Accordingly, feed trays 2A and 2B do not come into contact with the tips of the rocking levers 44A and 44B, but are lowered by their own weight to stop in a nearly horizontal position, whereby they form an extension of the plane of fixed tray 1.

When inputting a sheet feed signal in the above-mentioned state, 1st sheet feed rollers 3 and 4 and intermediate sheet feed rollers 39A and 39B are rotatively driven to feed sheet stack $S_0$, so that the front edge of sheet stack $S_0$ is brought into contact with sheet stopper 5. Some sheets are fed from the lower part of stack $S_0$ to sheet separating means 10 through the gap between sheet stopper 5 and 1st sheet feed roller 4. In sheet separating means 10, only one sheet $S_1$, which is the lowermost sheet of the stack, is fed out therefrom. The separating means comprises separating and feeding belt 13 which rotates about its supporting rollers, separating blade 14 and separating roller 15 both coming into pressing contact with belt 13, whereby sheet $S_1$ is then fed toward 2nd sheet feed roller 16A. When sensor 48 near 2nd sheet feed roller 16A detects the passage of the leading edge of sheet $S_1$, intermediate sheet feed rollers 39A and 39B are stopped from rotating. Successively, sheet $S_1$ is sandwiched and fed between separating and feeding belt 13 and 2nd sheet feed rollers 16A and 16B, and is then sandwiched and fed between original document platen 20 and sheet feed belt 22. When the leading edge of sheet $S_1$ hits sheet stopping member 23, the sheet feed is stopped. While the sheet feed is stopped, an image copying process is carried out by the optical exposure and scanning system.

When another sheet feed signal is given again, sheet stopping member 23 escapes from a given position and, at the same time, another cycle of the sheet feed operation is resumed. Accordingly, sheet $S_1$ is fed upward along sheet delivery guide 24 by sheet feed felt 22 and is then introduced into sheet delivery slot 27 by sheet delivery roller 25 and driven rollers 26A and 26B, so that sheet $S_1$ is returned to the top of sheet stack $S_0$ on sheet feed trays 2A and 2B anf fixed tray 1.

In the same manner, a sheet which was originally the 2nd sheet from the bottom of the stack becomes the bottom sheet and is then separated to be fed and conveyed. Thus, after completing sheet feeding, sheet conveying, sheet stopping, single-sheet copying, sheet conveying and sheet delivery, each sheet of the stack $S_0$ is returned to the top of the stack. After completing the aforementioned process for all sheets of stack $S_0$, one complete set of copies of stack $S_0$ is produced. By repeating the process as many times as is required, the desired number of copies of stack $S_0$ can be made and kept in order.

Figure 2:
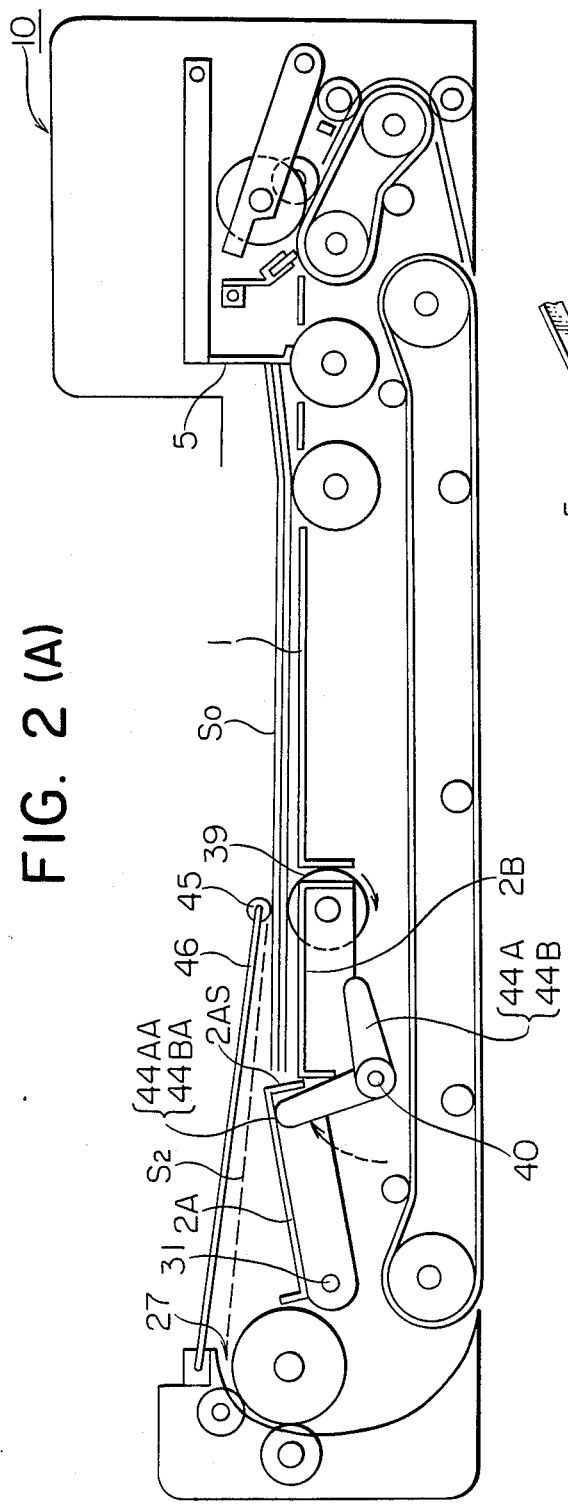
FIGS. 2(A) and 2(B) are the cross sectional and perspective views thereof, respectively.
Figure 2:
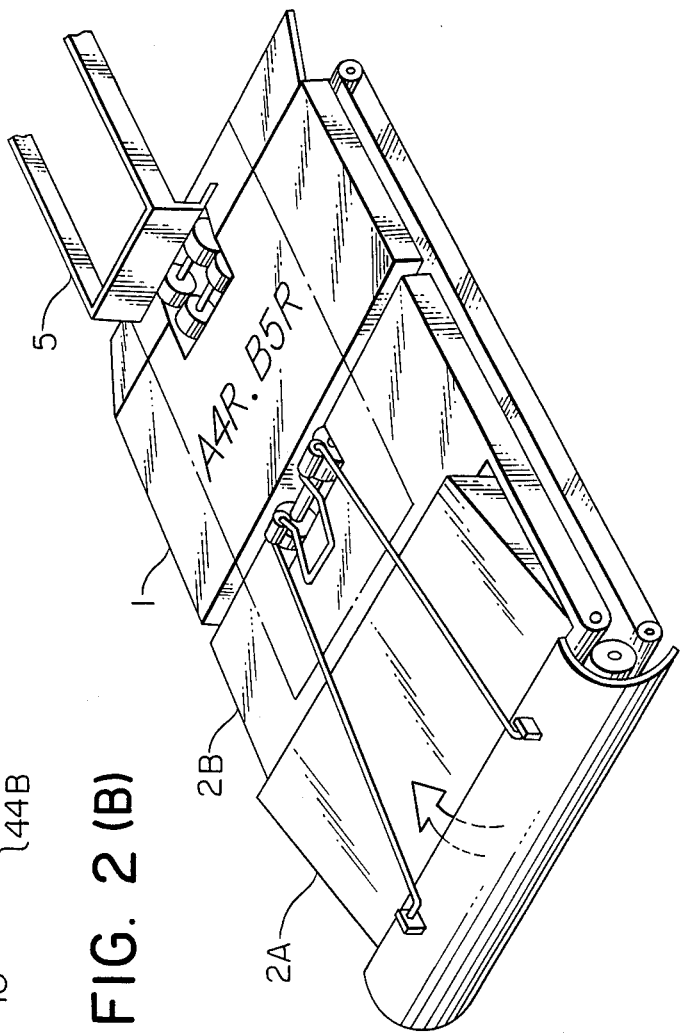

Referring now to FIGS. 2(A) and 2(B), the following detailed description will be made about how to operate an automatic sheet feeder relating to the invention in the case of feeding medium-sized sheets $S_2$ such as those of A4R or B5R size [specified in Japanese Industrial Standards (JIS)]. FIG. 2(A) is a cross sectional view thereof, and FIG. 2(B) is a perspective view of the substantial portion thereof.

When a sheet size selection switch or the like is ON for the purpose of feeding sheet $S_2$, motor 43 starts to rotate turning shaft 40 clockwise to lift up tips 44AA and 44AB of rocking levers 44A and 44B, so that sheet feed tray 2A only is rotated upward about driving shaft 31. At that point, right-end wall 2AS of sheet feed tray 2A projects from the upper surface of sheet feed tray 2B so as to serve as a stop against which the trailing edge of sheet $S_2$ rests.

Sheets $S_2$ are placed on sheet feed tray 2B and fixed tray 1 and are interposed between sheet stopper plate 5 and right-end wall 2AS of sheet feed tray 2A. Sheets $S_2$ delivered from sheet delivery slot 27 are returned to the top of sheet stack $S_0$ and are then discharged toward sheet stopper plate 5. The leading edge of sheet $S_2$ collides with sheet stopper plate 5 and may sometimes rebound therefrom. However, backward movement of sheet $S_2$ is prevented because the trailing edge of sheet $S_2$ abuts right-end wall 2AS of sheet feed tray 2A. Therefore, the edges of sheet stack $S_0$ are substantially aligned and erroneous sheet feed is prevented.

Figure 3A:
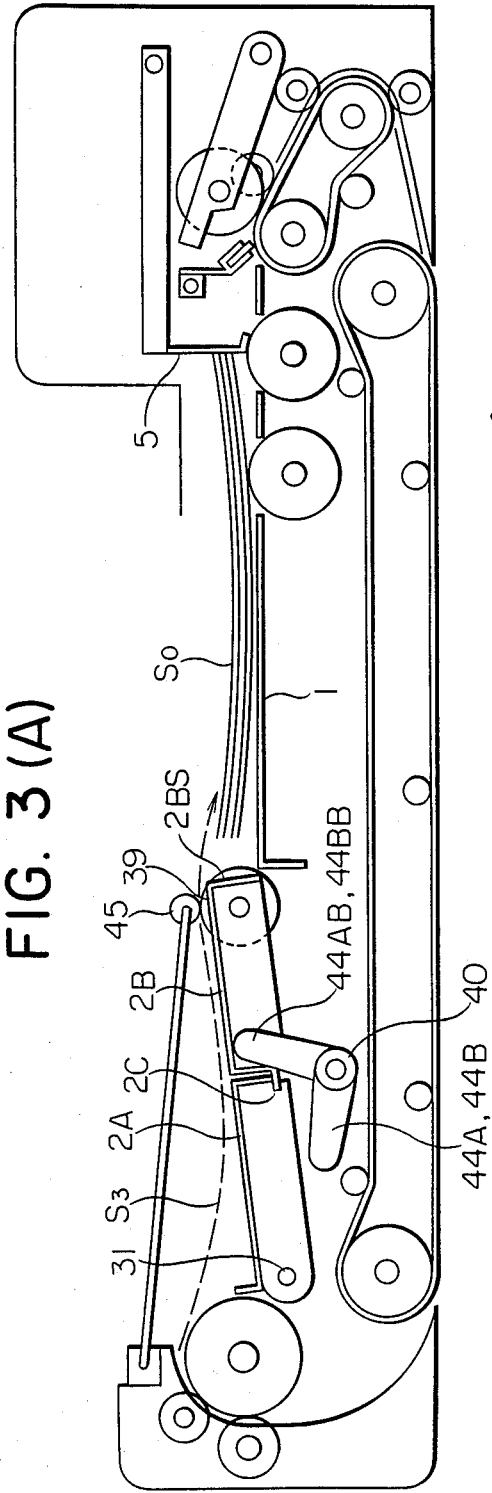
FIGS. 3(A) and 3(B) are the cross sectional and perspective views thereof, respectively.
Figure 3B:
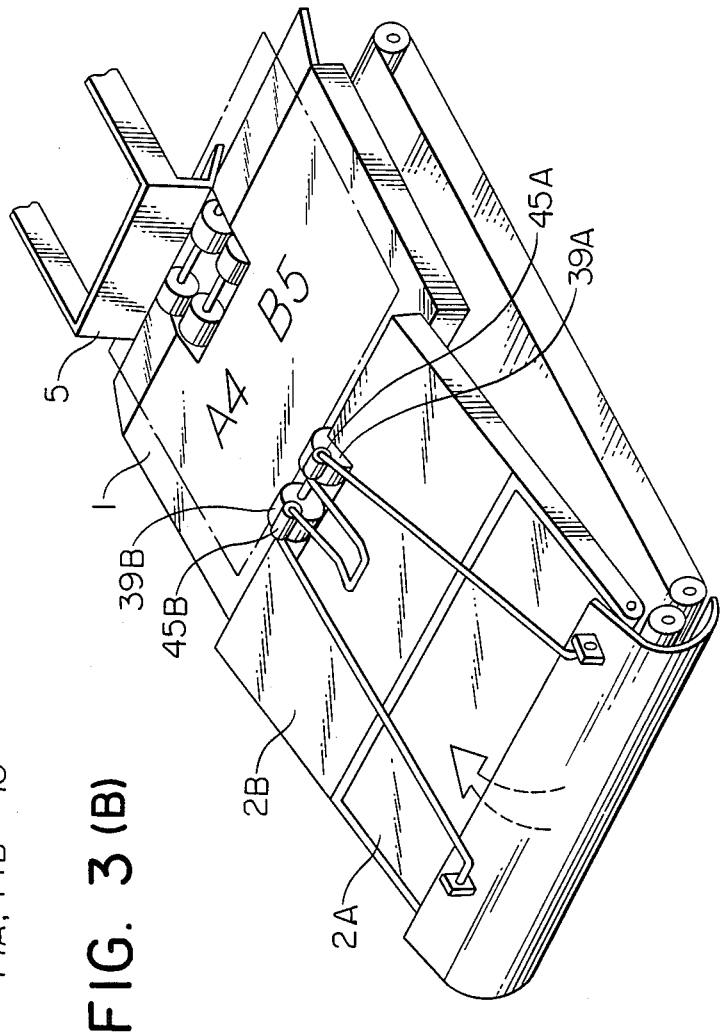

Referring now to FIGS. 3(A) and 3(B), the operation of the automatic sheet feeder of the present invention will now be described in the case of feeding small-sized sheets $S_3$ such as those of A4 or B5 size [specified in Japanese Industrial Standards (JIS)]. FIG. 3(A) is a cross sectional view thereof, and FIG. 3(B) is a perspective view of a substantial portion thereof.

When a sheet size selection switch or the like is ON for the purpose of feeding sheet $S_3$, motor 43 starts to rotate turning shaft 40 counterclockwise to lift up tips 44AB and 44BB of rocking levers 44A and 44B, so that sheet feed tray 2B is rotated upward about driving shaft 31 with the radius having the length of arms 36A and 36B. Sheet feed trays 2A and 2B are capable of freely coupling to each other in coupling position 2C. Therefore, when sheet feed tray 2B is rotated upward, sheet feed tray 2A being coupled to sheet feed tray 2B, moves with it and is rotated about driving shaft 31. The sheet placing surfaces of sheet feed trays 2A and 2B are on the same plane. Right-end wall 2BS of sheet feed tray 2B projects from the upper surface of fixed sheet feed tray 1 to serve as a stop for the trailing edge of sheet $S_3$.

Sheet $S_3$ is placed on the fixed sheet feed tray 1 and interposed between sheet stopper 5 and right-end wall 2BS of sheet feed tray 2B. Sheet $S_3$, which was delivered from sheet delivery slot 27, is fed between rotating intermediate sheet feed rollers 39A, 39B and driven rollers 45A, 45B and discharged toward sheet stopper plate 5, and is then returned to the top of sheet stack $S_0$. When the leading edge of sheet $S_3$ hits sheet stopper plate 5, sheet $S_3$ rebounds by the reaction of the collision. However, sheet $S_3$ is prevented from moving backward because it abuts right-end wall 2BS of sheet feed tray 2B or intermediate sheet feed rollers 39A, 39B. As in the other embodiments, the edges of the sheets are aligned, so that erroneous sheet feeding may be prevented.

Figure 4:
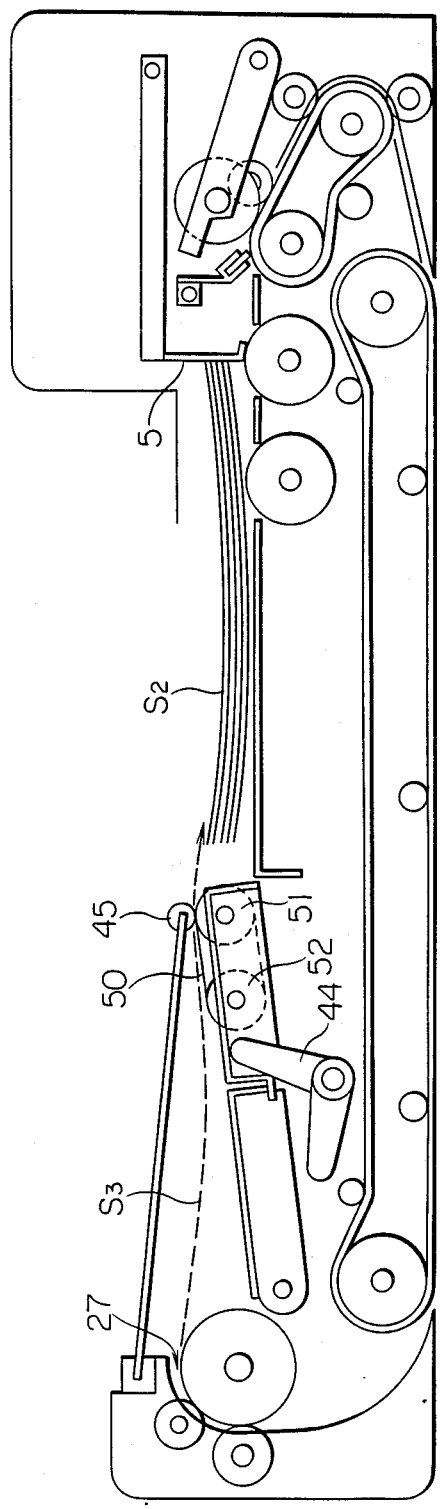
FIG. 4 illustrates a cross sectional view of the automatic sheet feeder embodied in another embodiment of the invention.

FIG. 4 is a cross sectional view showing another preferred embodiment of the automatic sheet feeder of the present invention. This embodiment is characterized by providing intermediate sheet feed belt 50 in place of intermediate sheet feed rollers 39A, 39B. Intermediate sheet feed belt 50 extends around driving roller 51 and driven roller 52 as to be rotated.

Small-sized sheet $S_3$, which was delivered from the above-mentioned sheet delivery slot 27, is fed by intermediate sheet feed belt 50 and is further moved toward sheet stopper plate 5 between sheet feed belt 50 and driven roller 45. Intermediate sheet feed belt 50 is particularly suitable for feeding small-sized sheets $S_3$.

In the automatic sheet feeders of the bottom-sheet feeding and circulating type according to the present invention, the sheet aligning operation can be performed when sheets of a stack placed on a sheet tray are fed to a sheet feeding system and are then circularly returned to the sheet tray. Particularly, when using sheets of a plurality of sizes, the edges of the sheets can be reliably aligned by using a combination of a sheet feed tray tiltable out of sheet trays each arranged separately and an intermediate sheet feed member provided close to the middle of the sheet stack. Also, in the case of feeding the 2nd and further sheets, the same operation as in the initial sheet feeding can be repeated. Therefore, the automatic sheet feeding operations can be performed continuously and reliably.

What we claim is:

1. An automatic feeder, capable of handling a plurality of sheet sizes, comprising
   (a) a sheet tray, adapted to receive a stack of sheets thereon having a top and a bottom, said sheet tray comprising a stationary tray having a sheet receiving surface, and at least one movable tray upstream of said stationary tray,
   (b) a sheet feed means adapted to feed single sheets from the bottom of said stack to a conveyor,
   (c) said conveyor adapted to move said single sheets to a predetermined position, and
   (d) means for returning said sheets to the top of said stack, wherein dimensions of said stationary tray and said movable tray are predetermined in accordance with said sizes and said movable tray is adapted to move out of vertical alignment with said stationary tray whereby edges of said sheets are aligned.

2. The feeder of claim 1 wherein said movable tray is adapted to move upward with relation to said stationary tray.

3. The feeder of claim 2 wherein, when said movable tray moves upward, said movable tray projects from said surface of said stationary tray and, when said movable tray moves downward, said movable tray moves into substantial alignment with said surface.

4. The feeder of claim 1 wherein said movable tray moves upward or downward in accordance with said size.

5. The feeder of claim 1 wherein, when said movable tray moves out of vertical alignment with said surface, a stop for said single sheets is formed.

6. The feeder of claim 5 wherein, while said movable tray is out of vertical alignment, the edges of said sheets returned to and superposed on the top of said stack are aligned against a wall of said movable tray.

7. The feeder of claim 5 wherein, when said movable tray is out of vertical alignment, the edges of said sheets returned to and superposed on the top of said stack are aligned against a wall of said stationary tray.

8. The feeder of claim 1 wherein there are at least two movable trays, each capable of moving together with or independently of the other.

9. The feeder of claim 1 comprising a stop means on one side of said sheet tray, stop feed means for shifting said stack of sheets to said stop means, means for separating said single sheets from the bottom of said stack through the lower end of said stop means, an intermediate sheet feed means on said movable tray, said intermediate sheet feed means adapted to shift said returned sheets to the top of said stack by interlocking operation with said movable tray based on said size.

10. The feeder of claim 1 wherein said movable tray is tiltable.

11. An automatic feeder, capable of handling a plurality of sheet sizes, comprising
    (a) a sheet tray, adapted to receive a stack of sheets thereon, having a top and a bottom, said sheet tray comprising a stationary tray having a sheet receiving surface, and at least one movable tray upstream of said stationary tray;
    (b) a sheet feed means adapted to feed single sheets from the bottom of said stack to a conveyor;
    (c) said conveyor adapted to move said single sheets to a predetermined position;
    (d) means for returning said sheets to the top of said stack; and
    (e) an intermediate sheet feed means, on said movable tray, adapted to move said single sheets from the bottom of said stack when said movable tray is substantially in vertical alignment with said stationary tray, and adapted to move said single sheets to the top of said stack when said movable tray is out of vertical alignment with said stationary tray, said movable tray adapted to move out of vertical alignment with said stationary tray whereby edges of said sheets are aligned.

12. The feeder of claim 11 wherein said movable tray is adapted to move upward with relation to said stationary tray.

13. The feeder of claim 11 wherein said intermediate sheet-feed means is adapted to change a sheet feeding mode interlockingly with movement of said movable tray whereby, when said movable tray is in the plane of said sheet receiving surface, said intermediate sheet-feed means feeds said sheet from the bottom of said stack of sheets and when said movable tray is out of alignment with said surface, said intermediate sheet-feed means feeds said sheet to the top of said stack of sheets.

14. The feeder of claim 13 wherein said intermediate sheet-feed means comprises a feed roller and a driven roller in pressing contact with said feed roller.

15. The feeder of claim 13 wherein said intermediate sheet-feed means comprises a feed belt and a driven roller in pressing contact with said belt.

16. The feeder of claim 11 wherein when said movable tray moves out of vertical alignment with said surface, a stop for said single sheets is formed.

17. The feeder of claim 11 wherein, when said movable tray moves upward, said movable tray projects from said surface of said stationary tray and, when said movable tray moves downward, said movable tray moves into substantial alignment with said surface.

18. The feeder of claim 11 wherein, while said movable tray is out of vertical alignment, the edges of said sheets returned to and superposed on the top of said stack are aligned against a wall of said movable tray.

19. The feeder of claim 11 wherein there are at least two movable trays, each capable of moving together with or independently of the other.

20. The feeder of claim 11 wherein said intermediate sheet-feed member can be operated interlockingly with said sheet-feed means and transfer said sheet to said predetermined position.

21. The feeder of claim 11 wherein said intermediate sheet-feed means is provided at one side of said movable tray and is located at a boundary between said stationary tray and said movable tray.

* * * * *